Dec. 9, 1958  K. KORDESCH ET AL  2,864,055
APPARATUS FOR AND METHOD OF BATTERY CAPACITY MEASUREMENT
Filed May 5, 1954  2 Sheets-Sheet 1
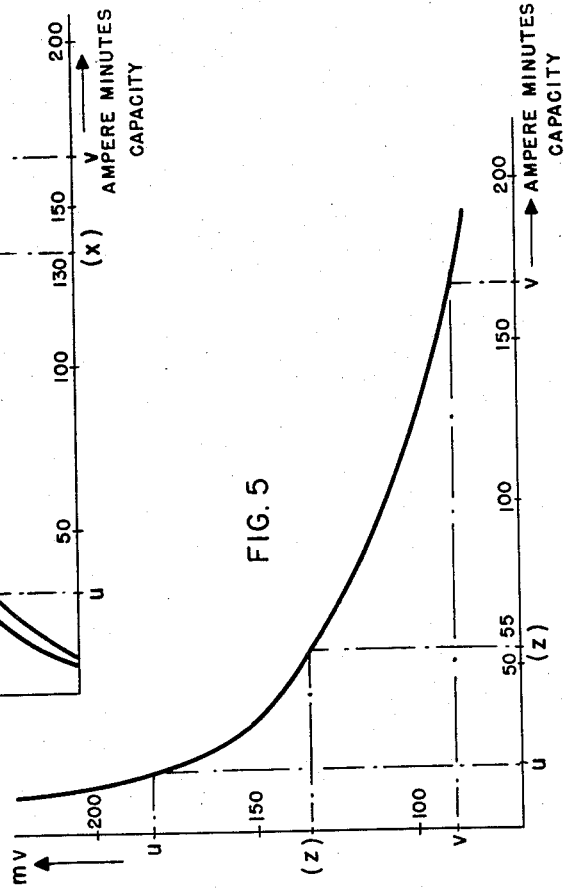
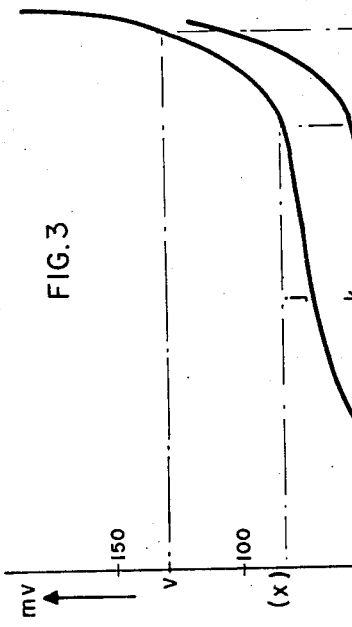
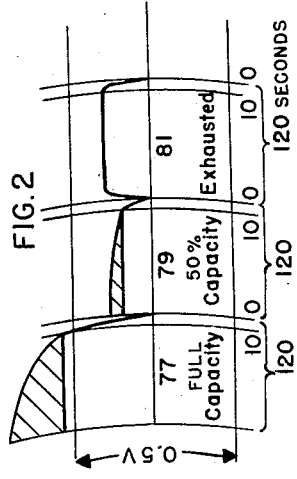
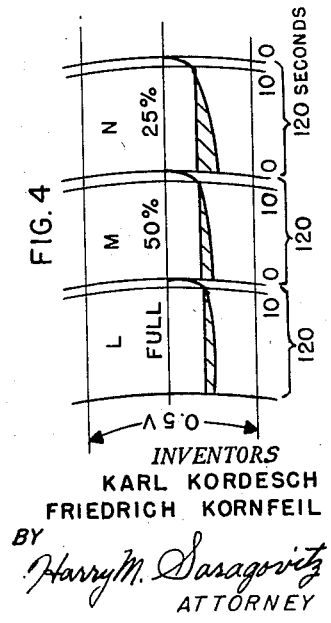
INVENTORS
KARL KORDESCH
FRIEDRICH KORNFEIL
BY
*Harry M. Saragovitz*
ATTORNEY Dec. 9, 1958   K. KORDESCH ET AL   2,864,055
APPARATUS FOR AND METHOD OF BATTERY CAPACITY MEASUREMENT
Filed May 5, 1954   2 Sheets-Sheet 2
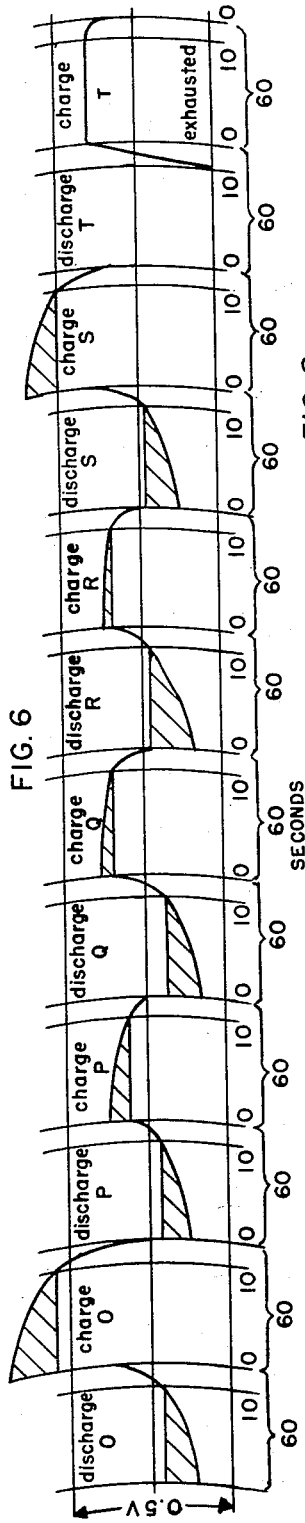
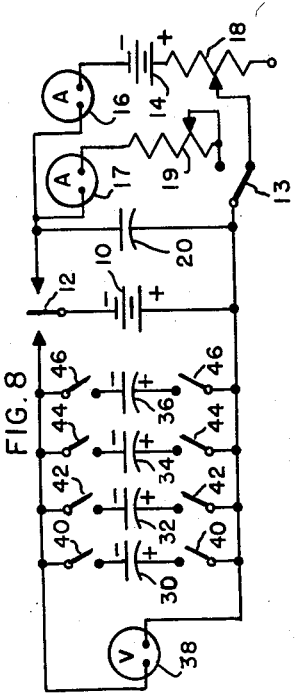
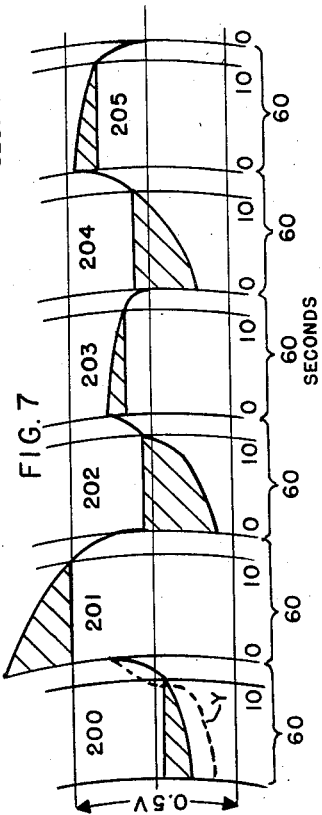
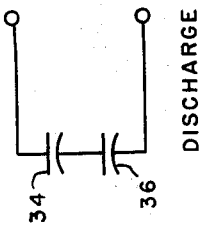
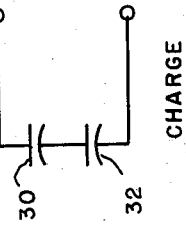
INVENTORS
KARL KORDESCH
FRIEDRICH KORNFEIL
BY
ATTORNEY

United States Patent Office 2,864,055
Patented Dec. 9, 1958

2,864,055

APPARATUS FOR AND METHOD OF BATTERY CAPACITY MEASUREMENT

Karl Kordesch and Friedrich Kornfeil, Long Branch, N. J., assignors to the United States of America as represented by the Secretary of the Army Application May 5, 1954, Serial No. 427,892

23 Claims. (Cl. 324—29.5)

(Granted under Title 35, U. S. Code (1952), sec. 266)

The invention described herein may be manufactured and used by or for the Government for governmental purposes, without the payment of any royalty thereon.

This invention relates to testing of batteries and more particularly to an apparatus and method for predicting remaining battery capacity.

In Patent 2,662,211 of Marko and Kordesch, "Device for Measuring the Discharge Voltage of Galvanic Cells" which issued on December 8, 1953, it is explained that the electrochemically generated E. M. F. in primary and secondary cells is influenced by polarisation which can be eliminated by a depolarising process. The terminal voltage occurring when discharging such a cell can be expressed by the E. M. F. of the cell diminished by the voltage drop caused by the virtual resultant internal resistance thereof, which is however, partly only of an ohmic nature, to wit, as far as the resistance constituents depending on the electrodes, the electrolyte and the boundary faces between the electrodes and the electrolyte are concerned. Although the influence of an incomplete depolarisation can be expressed in a substitute scheme as a voltage drop (internal resistance constituent), it is distinguished from the ordinary ohmic constituents of the internal resistance insofar as it is a function of the efficiency of depolarisation and of the discharge current i. e., it represents a value which depends with gas depolarisation of a porous electrode on the catalytic transfer reaction, on the porosity of the electrode as well as on the pressure and oxygen content of the gas or, with Leclanche cells, on the chemical reactivity of the manganese dioxide mixture, or, generally speaking, on the composition of the depolariser.

The known processes for measuring the internal resistance of galvanic cells give, for the reasons stated hereinabove, a resultant value of a virtual internal resistance which is composed of completely heterogeneous constituents. In some cases it is, however, of importance to be able to investigate the individual terms separately which influence this resultant value of internal resistance, and particularly the action of the depolariser. For example, in developing primary or secondary cells, there is the requirement of distinguishing whether a high internal voltage drop observed is due to a bad depolariser or to a high resistance of passage of the current due to unfavourable selection of the electrodes and/or electrolyte.

The methods heretofore most used in determining battery capacity and state of charge are the open circuit voltage test, the loaded voltmeter test, and the flash or short circuit current test. These tests are not generally reliable. The open voltage test merely serves the purpose of detecting inferior cells in a batch if the normal or average voltages are known, the flash current test is easily misinterpreted as it gives no information about the capacity of the cells, and the loaded voltmeter test requires a long period and uses up the cells.

These tests, whatever their value may be for a specific purpose are particularly inaccurate for batteries with a flat discharge characteristic (as shown on a voltage-capacity-curve) and capable of delivering high currents such as nickel-cadmium cells. In the case of the latter, the polarisation effect commonly called the "Reaction of the Battery to the Test," caused by the test load is characteristically small as it may be a voltage drop of a few millivolts and such an effect is less significant than other effects which should be observed. One such other effect is the high error in the voltage readings under load conditions. The internal ohmic resistance of a cell or battery is very low but nevertheless changes with time, electrolyte concentration, temperature and the consequent voltage observed is high because of the necessary test current. For example, the internal ohmic resistance of a single nickel-cadmium cell may be 0.0025 ohm and this resistance may fluctuate at least 20% (practice has shown that a freshly charged cell varies much more) so that it can be seen that with a 20 ampere test current, an error at least 20 millivolts is introduced. Since this error is of as great a magnitude as the polarisation effect due to the test itself, it is obvious that a test to be reliable must be devised which eliminates the effect of internal ohmic resistance.

If the open circuit voltage test is applied to a cell or battery, the voltage measurement depends upon many complex factors such as the nature and condition of the electrolyte, the temperature, the formation of unknown oxides, etc. These factors in the case of nickel-cadmium cells may cause a fluctuation as high as 30 millivolts. Therefore, the test cannot accurately indicate the state of charge of the cells as a good cell may have the same voltage as a poor one and only exhausted or freshly charged cells may be checked with a reasonable degree of accuracy. Obviously, it is not reasonable to use the open circuit voltage as a reference voltage in the performance of a test.

It is accordingly a primary object of the present invention to provide a convenient, accurate, and reliable method for predicting the remaining capacity in a battery or cell.

It is another object to provide a method for detecting a weak or used cell in a battery.

It is another object to provide an apparatus for recording the state of charge of a cell or battery.

In accordance with the present invention, there is provided a method of predicting the remaining capacity of a battery comprising periodically charging a plurality of batteries of a chosen type and having different respective known remaining capacities at a rapid rate with a constant current for a short period, indicating the difference in voltages of each of these batteries at the beginning and end of a predetermined duration within said period, periodically charging a battery of said type and of unknown capacity at said rate with said current for said period, indicating the difference in voltage of the unknown battery at the beginning and end of said predetermined duration within said period whereby the capacity of the unknown battery may be determined by the relationship which exists between the voltage difference indication of the battery of unknown capacity and the voltage difference indications of the batteries of known capacity.

For a better understanding of the invention together with other and further objects thereof, reference is had to the following description taken in connection with the accompanying drawings and its scope will be pointed out in the appended claims.

In the drawings, Fig. 1 is a circuit including recording means for carrying out the preferred method of the present invention. This circuit is described in U. S. Patent 2,662,211.

Fig. 2 consists of recorder curves obtained in the use of the circuit of Fig. 1 when the battery is in the charge circuit.

Fig. 3 consists of plotted curves illustrating relationships obtained by this method.

Fig. 4 is recorder curves obtained in the use of the circuit of Fig. 1 when the battery is in the discharge circuit.

Fig. 5 is a curve illustrating a relationship similar to that shown in Fig. 3.

Figs. 6 and 7 are further recorder curves which illustrate further data obtained by this method;

Fig. 8 depicts a circuit similar to the circuit of Fig. 1 wherein the recorder of the latter is replaced by an alternative indicating means.

Figs. 9 and 10 are circuits for indicating charge and discharge data obtained by the use of the circuit of Fig. 8.

Referring now more particularly to Fig. 1, the battery 10 to be tested which may be a nickel-cadmium cell, is alternatively connected to a charge or discharge circuit and to a voltage measuring circuit by a high rate periodic switch 12. Switch 12 is conveniently constructed for automatic operation and may be a vibrator operating at about 120 cycles, or any other suitable switching device well known in the art. When battery 10 is switched into the charge circuit through switch 13, which may be a double throw switch or like device, the circuit consists of a series arrangement of battery 10, a charging battery 14, a meter 16 such as a hot wire ammeter and a variable resistor 18. A capacitor 20 is connected across battery 10 to smooth current peaks. When battery 10 is switched into the discharge circuit through switch 13, the circuit consists of a series arrangement of battery 10, ammeter 17 similar to ammeter 16, and a variable resistor 19. Resistors 18 and 19 are provided to control the amount of current in the circuit. For testing single cells a battery 14 may be provided in the discharge circuit with reversed polarity to avoid difficulties caused by the low voltage and contact resistance within switch 12, especially when switch 12 is a vibrator. Otherwise, it might be impossible to get sufficient current such as 20 amperes from a 1.2 volt cell. Where single cells are being tested, it might be preferable to utilize devices such as electronic regulators instead of variable resistors 18 and 19.

When switch 12 periodically inserts battery 10 into the voltage measuring circuit, the circuit consists of battery 10, variable resistor 22 and a voltage recorder 24 which will indicate voltage at specific periods of time. The voltage recorder has built therein a timing mechanism to record the voltages obtained either after 5 or 10 seconds after the tests begin and either 1 or 2 minutes after the beginning of the test. The diagram on the recorder paper gives a relatively true picture of the state of the tested cell or battery. This is because the period that the battery is either in the discharge circuit or the measuring circuit is of shorter duration than the voltage recovery period due to the sluggishness of the chemical reaction of the cell. This short duration eliminates the effect of the internal ohmic resistance. Thus, the reading on the recorder is a value not effected by the internal resistance of battery 10. The voltage measured in the measuring circuit is an open circuit measurement and is substantially the same as it was $\frac{1}{120}$ seconds before under load (or charge) condition depending upon the sluggishness or slowness of the chemical reactions in the cell. A battery 26 is provided in circuit with resistance 22 to provide a reference point in recorder 24 so that resistor 22 is preferably a potentiometer or like arrangement. Capacitor 28 is provided in the measuring circuit in parallel arrangement with battery 10 to filter the voltages read in recorder 24.

In operation, using an exact working, timing, and reading mechanism, e. g., recorder 24 during the test periods, a reference voltage is defined within the test periods. For example, the voltage of the cell 5 or 10 seconds after the commencement of the test may be used as a reference voltage. The voltage decrease (discharge test) or the voltage increase (charge test) between the 5th or 10th second and the end of the test period such as after 1 or 2 minutes has been found to be a good indication of the state of charge. In the charge test, battery 10 is switched into the charge circuit and charged with a 10 ampere current from source 14 for 2 minutes. In the discharge test, battery 10 is switched into the discharge circuit and discharged with a 20 ampere current through resistor 19 for 2 minutes. From both of these tests, reproducible values are obtained for the prediction of remaining capacity. Of course, the periods for obtaining reference voltages and for test duration are given only by way of example and may be varied within prescribed limits.

Fig. 2 shows the characteristic recorder curves obtained in a charge test as described above for a full capacity cell 77, a cell 79 with 50% remaining capacity and an exhausted cell 81. The abscissa is time and the ordinate is voltage. The current in the circuit is 10 amperes. As stated previously in the description of Figure 1, typical cells which may be tested are nickel-cadmium cells which are generally rated in the vicinity of about 1.2 volts. As seen from this curve, during the charge test of two minutes duration a full capacity cell will indicate a much greater voltage increase than a 50% capacity cell between the 10-second point and the end of the test. The curve for each cell is read from right to left and the 10-second point is selected at the beginning of a test to eliminate any uncertainty as to the presence of the effect of open circuit voltage at the beginning of the charging. For convenience, the difference between the voltage at the 2-minute point and the 10-second point of the charge test may be designated as "Indicating Voltage Difference." In a 1-minute charge test, the "Indicating Voltage Difference" may be measured between the 1-minute and 5-second points of the test.

In the curves of Fig. 3, the abscissa represents the remaining capacity in the cells in ampere minutes and the ordinates represent the difference between the two voltage readings in millivolts. Cells having different states of charge used to obtain the curves of Fig. 3 were prepared by partially discharging a number of cells for different amounts and then the cells were completely discharged after the test to determine the remaining capacities. Curve J represents the values obtained by a 2 minute charging test at 10 amperes with several cells of varying capacities, the values being the voltage readings between 5 seconds and two minutes and curve K represents a corresponding curve for the difference obtained on cells of different capacities at 10 seconds and 1 minute with a 10 ampere current. For example, a nickel cadmium cell $u$ subjected to the 2-minute charge test showed an "Indicating Voltage Difference" of about 40 millivolts; then upon being completely discharged was found to have about 30 ampere minutes capacity remaining. Likewise, nickel cadmium cell $v$ had an "Indicating Voltage Difference" of about 135 millivolts, and upon discharge was found to have about 165 ampere minutes remaining capacity. Subjecting several nickel cadmium cells to the charge test to obtain their "Indicating Voltage Differences" supplied the necessary values of the ordinates of the curves of Figure 3, and then the discharging of these cells provided remaining capacity abscissa values for the same curves. After the curves were drawn, it was now possible to subject nickel cadmium cell $(x)$ to the 2-minute charge test to find an "Indicating Voltage Difference" of about 85 millivolts. Now, locating the 85 millivolt point on the ordinate of curve J, the remaining capacity of cell $(x)$, 130 ampere minutes, could be read off on the abscissa as remaining capacity. Thus, it is seen that with the provision of curves J and K it is necessary merely to subject a cell of unknown remaining capacity to the charge test and such capacity can be directly predicted. The 2 minute test curve J is in itself a satisfactory test, as it enables the determination of the state of charge within 10%, if the cells in the tested battery are uniform within 10%.

When a discharge test is applied to a battery such as a nickel-cadmium battery or cell, battery 10 is inserted into the discharge circuit through switch 13 and the difference in voltage between that obtained 10 seconds after commencing the test and of the completion of the test at 2 minutes are obtained from the recorder paper.

Fig. 4 shows the characteristic recorder curves for a full cell L, a half discharged cell M, and a cell N with only 25% remaining capacity. The abscissa is time and the ordinate is voltage. The current in the discharge circuit is adjusted to 20 amperes and the curves indicate the voltage of the respective batteries at zero time, 10 seconds and 120 seconds. From the curve, there can be observed the voltage difference at the 10 second and 2 minute marks. Integration of the shaded areas of the recorder curves will indicate the exact energy output difference which in turn is even more accurate than voltage difference. The discharge test permits direct evaluation as to whether the battery tested is satisfactory in a case where a speedy qualitative rating of "excellent," "good," "satisfactory," "weak," or "bad" is desired.

In Fig. 5 there is graphically depicted the results obtained from a 20 ampere 1 minute discharge test immediately following a 10 ampere 1 minute charge test. The abscissa is the remaining capacity of the cells tested and the ordinates are the difference between the voltages of the cell at the 10 second points and 1 minute points of the test. The curve of Figure 5 is similar to that of curves J and K in Figure 3, the ordinates, the "Indicating Voltage Difference" being the difference between the voltage at the 10-second mark and the 1-minute mark of the discharge test. For example, cell $u$, when subjected to the discharge test, showed an "Indicating Voltage Difference" of about 150 millivolts and then upon being completely discharged was found to have a remaining capacity of about 30 ampere minutes. Likewise cell $v$ when subjected to the discharge test showed an "Indicating Voltage Difference" of about 90 millivolts and then upon being fully discharged was found to have about 170 ampere minutes remaining capacity. Several cells such as $u$ and $v$ were subjected to the discharge test to obtain ordinate data for the curve of Figure 5 and then these cells were completely discharged to obtain the abscissa data. Now, upon subjecting the unknown cell ($z$) to the discharge test, the "Indicating Voltage Difference" thereof was found to be about 135 millivolts. Locating such point in the curve of Figure 5 gave the information that cell ($x$) had a remaining capacity of about 55 ampere minutes. This curve has been found to be sufficiently accurate to predict the remaining capacity of the battery within ±10% provided that the cells of the battery are uniform and are similarly treated.

It has been found that a combination of the charge and discharge tests provide superior results to a single test. One advantage of the combined test is the saving of time as only half the test time, 1 minute each for both the charge and discharge tests are needed. This is because the accuracy of the discharge test is increased if it immediately follows even a short charge test as will be explained hereinbelow. Another advantage of the combined charge, discharge test is apparent in a situation where the cells thereof are not uniform. If the cells of the battery under test are not uniform, the charge test gives a value higher than the average value and the discharge test shows a lower value than the average would be. Therefore, if the two tests give different results, it is an indication that something is wrong with the battery. A combined charge and discharge test also eliminates the need for storing the battery for several days to normalize it prior to testing since a battery coming directly from a charge board often gives a higher voltage drop than is expected under load conditions and its rating may be "good" instead of "excellent." The cause of this misleading information in new batteries is the extreme high voltage that the cell has been recently subjected to and a truer rating is obtained after the normalization period.

A short discharge period prior to the test accomplishes the same normalizing effect, quickly. However, it is preferable to store the batteries for about two hours before applying the combined test.

Fig. 6 shows the recorder paper curves obtained during a combined 10 ampere 1 minute charge test and 20 ampere 1 minute discharge test for 6 single nickel-cadmium cells O to T having different states of charge. The ordinates of the curves are voltage difference between the 10 second point and 1 minute points of the tests and the abscissa is time. The shaded areas indicate integrated values of voltage difference. Cell O is unused with full capacity, P is a used cell with 75% capacity remaining, Q is a used cell with 50% capacity remaining, R is a used cell with 25% capacity remaining, S is an unused cell that has been stored for 6 months and T is a cell that is almost exhausted.

When the test method of the present invention is applied to a battery consisting of two cells, if both cells are of uniform remaining capacity, a correct prediction of this remaining capacity of the battery may be made. If the cells are different in capacity, the charge test gives an indication much higher than the average value. For instance, the cell U tested in curves J and K of Fig. 3 has only 30 ampere minutes capacity remaining and the cell V has 165 ampere minutes capacity remaining. The obtained voltage differences $$\frac{U+V}{2}$$

(X) indicates 130 ampere minutes capacity remaining. The discharge test gives a value which is much too low, compared with the average value. For example, in Fig. 5 made with the same cells U and V, the cell U has 20 ampere minutes capacity remaining, the cell V has 165 ampere minutes capacity remaining and the obtained voltage difference capacity (Z), divided by 2 indicates 55 ampere minutes. These examples show that if both tests give the same result, the battery consists of uniform cells and the test gives a correct indication of remaining capacity. If they are not uniform, a true indication is not given. The same interpretation may be given to the combined test results of a single cell if the cell consists of two non-uniform plates.

In Fig. 7, there is shown the application of the present test method to detect a weak cell in a battery. Sections 200 and 201 are the discharge and charge characteristics of a 24 cell battery unused, full capacity, as shown on the voltage recorder paper, the tests being a 1 minute 10 ampere charge test and 1 minute 20 ampere discharge test, the voltage difference between the 10 second and 1 minute marks of the tests being shown in the shaded areas. The dotted line Y in section 200 indicates the discharge test if one cell is exhausted. Sections 202 and 203 show the same tests with a used battery with one exhausted cell. The extreme voltage change in the discharge test is clearly seen in 202. Such a great change would not occur in the discharge test had not the charge test preceded it. The explanation of this phenomenon is that during the period of the charge test, the weak cell is partly charged and reaches its normal voltage. However, the cell cannot withstand the discharge test and accordingly a sudden large voltage drop is indicated in the discharge curve. In the interpretation, it is to be noted that in this case, it is particularly important to obtain the reference reading within the first 10 seconds so that the initial great voltage drop is clearly indicated and a poor cell may be detected. Sections 204 and 205 show the results obtained by the same combined test from an unused battery which had been stored for more than three months. The charge test indicates a high capacity for some good cells in the battery but the discharge test indicates some poor cells as shown by the large voltage drop. From the test, it would be recommended that such a battery not be used.

In Fig. 8, there is shown an apparatus for accomplishing the tests of the present invention without the use of recorder 24 of Fig. 1. Capacitors 30, 32, 34 and 36 are connected in parallel with battery 10 to be tested and with a voltmeter 38 which is in series with battery 10 and has a high resistance such as 50,000 ohms per volt. An electronic voltmeter is preferable in this regard. Switches 40, 42, 44 and 46 are provided to remove successively, capacitors 30, 32, 34 and 36 from the circuit.

In operation, battery 10 is switched into the charge circuit by switch 13 and the 1 minute 10 ampere charge test is begun. After 10 seconds, switch 40 is opened and capacitor 30 is removed from the circuit. At the end of 1 minute, switch 42 is opened, capacitor 32 is removed from the circuit and simultaneously, battery 10 is inserted into the discharge circuit by switch 13 and the 1 minute, 20 ampere discharge test begins. After 10 seconds, switch 44 is opened removing capacitor 34 from the circuit and after 1 minute, switch 46 is opened removing capacitor 36 from the circuit and the discharge test is completed. As described above, the voltage difference between that at the 10 second point and the minute point of the respective tests are the significant values which are observed. Since capacitor 30, retains a voltage charge equal to the voltage of battery 10 at the 10 second point of the charge test and capacitor 32 retains a voltage charge equal to the voltage of battery 10 at the 1 minute point of the charge test, connecting these capacitors in series with a voltmeter will indicate the voltage difference indication obtained in the charge test. In like manner, capacitors 34 and 36 when connected in series will indicate the voltage difference in the discharge test. Figs. 9 and 10 indicate the series arrangements of capacitors 30 and 32 and 34 and 36 respectively. Of course, a suitable timing mechanism (not shown) may be provided to control the various switch openings and closings in the circuit of Fig. 8.

While there have been described what are at present considered to be the preferred embodiments of this invention, it will be obvious to those skilled in the art that various changes may be made therein without departing from the invention, and it is, therefore, aimed in the appended claims to cover all such modifications as fall within the true spirit and scope of the invention.

What is claimed is:

1. A method of predicting the unknown remaining capacity of a battery comprising periodically charging a plurality of batteries of a chosen type and having different respective known remaining capacities at a rapid rate with a constant current for a short period, indicating the difference in voltages of each of these batteries at the beginning and end of a predetermined duration within said period, charging a battery of said type and of unknown capacity at said rate with said constant current for said period and indicating the difference in voltage of the battery of unknown capacity at the beginning and end of said predetermined duration whereby the capacity of the unknown battery may be determined by the relationship which exists between the voltage difference indication of the battery of unknown capacity and the voltage difference indications of the batteries of known capacity.

2. A method as in claim 1 wherein said current is about 10 amperes.

3. A method as in claim 1 wherein said period is about 2 minutes and said duration is between the 10th and 120th second of said 2 minutes.

4. A method as in claim 1 wherein said rate is 120 times per second.

5. A method of predicting the unknown remaining capacity of a battery comprising periodically discharging a plurality of batteries of a chosen type and having respective different known remaining capacities at a rapid rate with a constant current for a short period, indicating the differences in voltages of each of these batteries at the beginning and end of a predetermined duration within said period, discharging a battery of said type and of unknown capacity with said current for said period at said rate and indicating the difference in voltage of said unknown battery at the beginning and end of said predetermined duration whereby the capacity of the unknown battery may be determined by the relationship which exists between the voltage difference indication of the battery of unknown capacity and voltage indication differences of the batteries of known capacity.

6. A method as in claim 5 wherein said current is about 20 amperes.

7. A method as in claim 5 wherein said period is about 2 minutes and said duration is between the 10th and 120th second of said 2 minutes.

8. A method as in claim 5 wherein said rate is 120 times per second.

9. A method of predicting the unknown remaining capacity of a battery comprising periodically charging a plurality of batteries of a chosen type and having different respective known remaining capacities at a rapid rate with a first constant current for a first short period, periodically discharging said batteries at said rate with a second constant current for a second short period, indicating the difference in voltages of said batteries at the beginning and end of a predetermined duration within said second period, periodically charging a battery of said type and of unknown capacity at said rate with said first current for said first period, periodically discharging said unknown battery at said rate with said second constant current for said second period and indicating the difference in voltage of said unknown battery at the beginning and end of said predetermined duration whereby the capacity of the unknown battery may be determined by the relationship which exists between the voltage difference indication of the battery of unknown capacity and the voltage difference indications of the batteries of known capacity.

10. A method as in claim 9 wherein said first period and second periods are each 1 minute and said duration is between the 10th and 60th second of said minute.

11. A method as in claim 9 wherein said first constant current is 10 amperes and said second constant current is 20 amperes.

12. A method as in claim 9 wherein said rate is 120 times per second.

13. A method for determining the uniformity of constituent cells of a battery comprising periodically charging a plurality of batteries of a chosen type and having respective known different remaining capacities and consisting of cells of uniform capacity at a rapid rate with a first constant current for a first short period, indicating the differences in the voltages of these batteries at the beginning and end of a predetermined duration within said period, periodically discharging said batteries at a rapid rate with a second constant current for a second short period, indicating the differences in voltages of these batteries at the beginning and end of a predetermined duration within said second period, periodically charging a battery of said type and consisting of cells of unknown capacity and unknown uniformity with said first current at said first rate for said first period, indicating the difference in voltage of said battery at the beginning and end of said predetermined duration within said first period, periodically discharging said unknown battery with said second current at said rapid rate for said second period, indicating the difference in voltage of said battery at the beginning and end of said predetermined duration within said second period whereby the capacity of the unknown battery may be determined by the relationship which exists between the voltage difference indication of the battery of unknown capacity and the voltage difference indications of the batteries of known capacity and whereby significant deviations of the voltage difference indications of said battery of unknown uniformity from the voltage difference indications of uniform batteries of equal capacity demonstrates a lack of cell uniformity in said unknown battery.

14. A method as in claim 13 wherein said first constant current is about 10 amperes and said second constant current is about 20 amperes.

15. A method as in claim 13 wherein said periods are about 1 minute and said duration is from the 10th to the 60th second of said periods.

16. A method as in claim 13 wherein said rate is about 120 times per second.

17. A circuit for indicating the changes in voltage of a battery for a predetermined duration within a given period when said battery is rapidly periodically charged for said duration and then rapidly periodically discharged for said duration comprising a first circuit for charging said battery with a first constant current, a second circuit for discharging said battery with a second constant current, means for connecting said battery either with said charging or discharging circuits, a circuit for indicating said changes in voltages, periodic switching means in circuit with said battery for alternately rapidly inserting said battery either in circuit with said indicating circuit or either said charging or discharging circuit, indicating means comprising a parallel arrangement of first, second, third, and fourth capacitors which are connected in parallel with said battery when said battery is in said indicating circuit, means for removing said first capacitor from said indicating circuit at the beginning of said charging duration, means for removing said second capacitor from said indicating circuit at the end of said charging duration, means for removing said third capacitor from said indicating circuit at the beginning of said discharging duration, and means for removing said fourth capacitor from said indicating circuit at the end of said discharging duration whereby the difference in the charge of said first and second capacitors is the voltage change in said battery in said charging duration and the difference in the charge of said third and fourth capacitors is the voltage change in said battery in said discharging duration.

18. A circuit as in claim 17 wherein said periodic switch means is a 120 cycle per second vibrator.

19. A method of predicting the unknown remaining capacity of a battery comprising intermittently charging a plurality of batteries of a chosen type and having different respective known remaining capacities with a constant current for short periods, indicating the difference in voltages of each of these batteries at the beginning and end of predetermined intervals within said periods, intermittently charging a battery of said type and of unknown capacity with the same current for like periods and indicating the difference in voltage of the battery of unknown capacity at the beginning and end of intervals of like duration, said intervals being shorter than voltage recovery period of the batteries, whereby the capacity of the unknown battery may be determined by the relationship which exists between the voltage difference indication of the battery of unknown capacity and the voltage difference indications of the batteries of known capacity.

20. A method of predicting the unknown remaining capacity of a battery comprising the steps of charging a plurality of batteries of a chosen type and having different respective known remaining capacities for a first short period, periodically discharging said batteries for a second short period, indicating the difference in voltages of said batteries at the beginning and end of a predetermined interval within said second period, said interval being shorter than the voltage recovery time of said batteries, and performing the same steps on a battery of said type and of unknown capacity, whereby the capacity of the unknown battery may be determined by the relationship which exists between the voltage difference indication of the battery of unknown capacity and the voltage difference indications of the batteries of known capacity.

21. A method of predicting the unknown remaining capacity of a battery comprising the steps of charging a plurality of batteries of a chosen type and having different respective known remaining capacities for like periods, indicating the difference in voltages of each of these batteries at the beginning and end of intervals within said periods, said intervals being shorter than the voltage recovery time of said batteries, and performing the same steps on a battery of said type and of unknown capacity, whereby the capacity of the unknown battery may be determined by the relationship which exists between the voltage difference indication of the battery of unknown capacity and the voltage difference indications of the batteries of known capacity.

22. A method of predicting the unknown remaining capacity of a battery comprising the steps of discharging a plurality of batteries of a chosen type and having respective different known remaining capacities for like periods, indicating the difference in voltages of each of these batteries at the beginning and end of intervals within said periods, said intervals being shorter than the voltage recovery time of said batteries, and performing the same steps on a battery of said type and of unknown capacity, whereby the capacity of the unknown battery may be determined by the relationship which exists between the voltage difference indication of the battery of unknown capacity and voltage indication differences of the batteries of known capacity.

23. A method of predicting the unknown remaining capacity of a battery comprising intermittently discharging a plurality of batteries of a chosen type and having respective different known remaining capacities with a constant current for short periods, indicating the differences in voltages of each of these batteries at the beginning and end of predetermined intervals within said periods, intermittently discharging a battery of said type and of unknown capacity with the same current for like periods and indicating the difference in voltage of said unknown battery at the beginning and end of intervals of like duration, said intervals being shorter than the voltage recovery periods of said batteries, whereby the capacity of the unknown battery may be determined by the relationship which exists between the voltage difference indication of the battery of unknown capacity and voltage difference indications of the batteries of known capacity.

References Cited in the file of this patent

UNITED STATES PATENTS

| | | |
|---|---|---|
| 1,922,792 | Cain | Aug. 15, 1933 |
| 2,225,231 | Pugh | Dec. 17, 1940 |
| 2,367,746 | Williams | Jan. 23, 1945 |
| 2,540,225 | Wengel et al. | Feb. 6, 1951 |
| 2,632,793 | Linn | Mar. 2, 1953 |
| 2,644,132 | Christie et al. | June 30, 1953 |
| 2,662,211 | Marko et al. | Dec. 8, 1953 |